US009626252B1

(12) United States Patent
Chopra et al.

(10) Patent No.: US 9,626,252 B1
(45) Date of Patent: Apr. 18, 2017

(54) SAVE SET INDEXING OUTSIDE OF BACKUP WINDOWS

(71) Applicant: EMC Corporation, Hopkinton, MA (US)

(72) Inventors: Shelesh Chopra, Bangalore (IN); John C. Rokicki, Hopkinton, MA (US)

(73) Assignee: EMC IP Holding Company LLC, Hopkinton, CA (US)

( * ) Notice: Subject to any disclaimer, the term of this patent is extended or adjusted under 35 U.S.C. 154(b) by 233 days.

(21) Appl. No.: 14/222,971

(22) Filed: Mar. 24, 2014

(51) Int. Cl.
*G06F 17/30* (2006.01)
*G06F 11/14* (2006.01)

(52) U.S. Cl.
CPC ................. *G06F 11/1458* (2013.01)

(58) Field of Classification Search
CPC .................................................. G06F 11/1458
See application file for complete search history.

(56) References Cited

U.S. PATENT DOCUMENTS

| | | | | |
|---|---|---|---|---|
| 7,165,082 B1* | 1/2007 | DeVos | ................ | G06F 11/1451 707/999.202 |
| 7,647,466 B1* | 1/2010 | Rao | .................... | G06F 11/1458 711/170 |
| 8,793,222 B1* | 7/2014 | Stringham | ........ | G06F 17/30091 707/649 |
| 9,015,122 B2* | 4/2015 | Harrison | ............. | G06F 17/3007 707/646 |
| 2006/0271604 A1* | 11/2006 | Shoens | ............. | G06F 17/30088 |
| 2007/0043790 A1* | 2/2007 | Kryger | ................ | G06F 11/1448 |
| 2008/0059733 A1* | 3/2008 | Otani | .................. | G06F 11/1458 711/162 |
| 2008/0294605 A1* | 11/2008 | Prahlad | ............. | G06F 17/30622 |
| 2010/0185592 A1* | 7/2010 | Kryger | ................ | G06F 11/1448 707/679 |
| 2011/0145199 A1* | 6/2011 | Prasad Palagummi | ......... | G06F 11/1435 707/654 |
| 2012/0166390 A1* | 6/2012 | Merriman | ........... | G06F 11/1458 707/613 |
| 2012/0215745 A1* | 8/2012 | Prahlad | ............. | G06F 17/30622 707/673 |
| 2014/0181027 A1* | 6/2014 | Whitehead | ........ | G06F 17/30174 707/639 |
| 2014/0201154 A1* | 7/2014 | Varadharajan | ...... | G06F 11/1451 707/647 |

OTHER PUBLICATIONS

Fu, Yin-jin; Xiao, Nong; Liao, Xiang-ke; Liu, Fang, "Application-Aware Client-Side Data Reduction and Encryption of Personal Data in Cloud Backup Services", Journal of Computer Science and Technology 28.6, Nov. 2013, pp. 1012-1024.*

* cited by examiner

*Primary Examiner* — Etienne Leroux
*Assistant Examiner* — Jared Bibbee
(74) *Attorney, Agent, or Firm* — Dergosits & Noah LLP; Todd A. Noah

(57) ABSTRACT

Save set indexing outside of backup windows is described. A system creates a snapshot of a save set without creating an index of the save set. The system creates the index of the save set in response to creating the snapshot of the save set.

17 Claims, 4 Drawing Sheets

SAVE SET INDEXING OUTSIDE OF BACKUP WINDOWS

BACKGROUND

If a software error corrupts a data object, or if erroneous data updates the data object, a data protection administrator may restore the data object to a previous uncorrupted state that does not include the corrupted or erroneous data. A backup application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup application to execute a restore operation to restore a copy of the corresponding backup files for that state to the data object.

A snapshot is a capture of a state of a data object, such as a file system or an application, at a specific moment in time. A file system may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup application to create snapshots of data objects stored on multiple storage arrays.

Snapshot and replication operations of data objects are key strategies to meet demanding Service Level Objectives (SLO) such as Recovery Point Objectives (RPO) and Recovery Time Objectives (RTO). Snapshots have changed the way that backups are perceived and led to a paradigm shift in the domain of backups. Snapshots are a mechanism that can drastically reduce the time required for backing up a data object, which may be referred to as a backup window, which may enable achievement of aggressive Service Level Agreements (SLA) that many businesses demand.

DETAILED DESCRIPTION

When using snapshots methodologies to provide backups, one requirement that significantly increases the backup window is the indexing of save sets for snapshots. Although a snapshot in itself is very quick, indexing a save set for a snapshot is still a legacy process that is very slow. For example, if a backup operation is required for a file system /FS1, a legacy backup application parses the save set for the file system /FS1 to identify its contents, creates an index of the contents of the save set for file system /FS1, and only then initiates the backup/snapshots of the file system /FS1. Legacy indexing approaches take advantage of snapshots, but are relatively slow and still occur during the backup windows, which can result in failing requirements for service level agreements, all of which leads to a lower total customer experience.

Embodiments herein provide save set indexing outside of backup windows. A system creates a snapshot of a save set without creating an index of the save set. For example, a backup application creates a snapshot of a file system /FS1 without an indexing tool indexing the file system /FS1 during the backup window. The system creates the index of the save set in response to creating the snapshot of the save set. For example, at a later time the indexing tool mounts the snapshot of file system /FS1 on a proxy host, thereby recreating the save set for file system /FS1 on the proxy host, parses the recreated save set for file system /FS1 to identify its, creates an index of the contents to function as the index of the save set for file system /FS1, and un-mounts the snapshot of file system /FS1. The indexing tool moves the indexing out of the backup window, where the indexing tool can take advantage of the intelligent modes of indexing using different options and technological advancements, thereby overcoming challenges in the legacy indexing process. When indexing is decoupled from the backup window, indexing can occur much later than the backup, which significantly reduces overall backup time. The indexing tool enables the system to meet more aggressive timelines of service level agreements and to efficiently handle more snapshots during the same amount of time, which results in a higher total customer experience.

Figure 1:
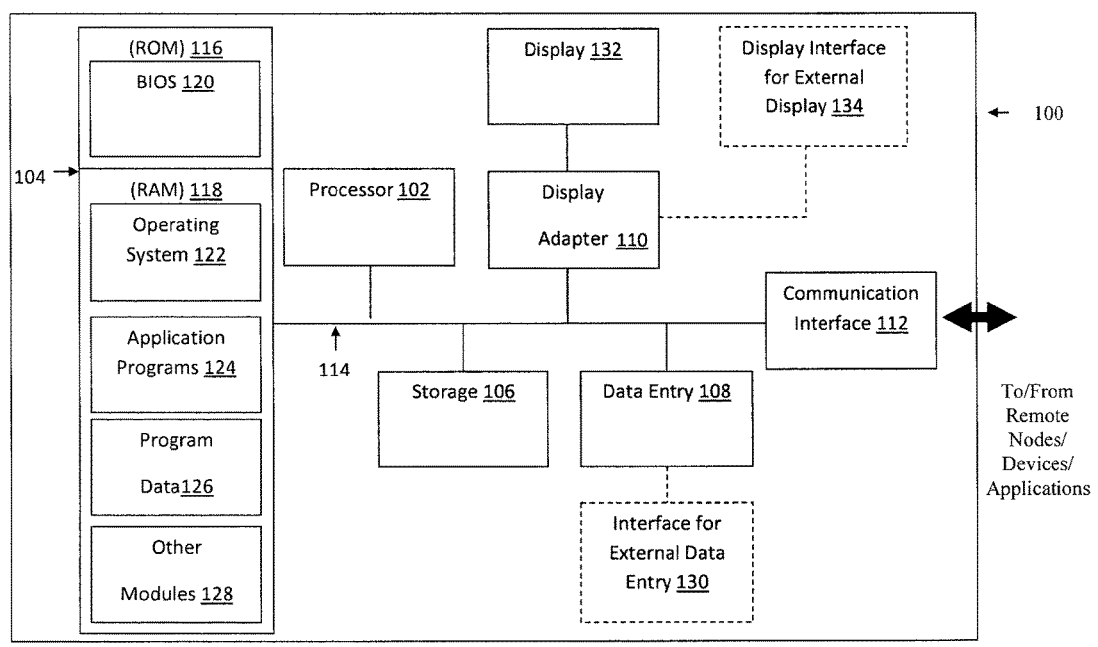
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for save set indexing outside of backup windows.

In the prior art, indexing is relatively slow and still occurs during the backup windows, which can result in failing requirements for service level agreements, all of which lead to a lower total customer experience. Embodiments herein enable save set indexing outside of backup windows. An indexing tool moves the indexing out of the backup window, where the indexing tool can take advantage of the intelligent modes of indexing using different options and technological advancements, thereby overcoming challenges in the legacy indexing process.

Figure 2:
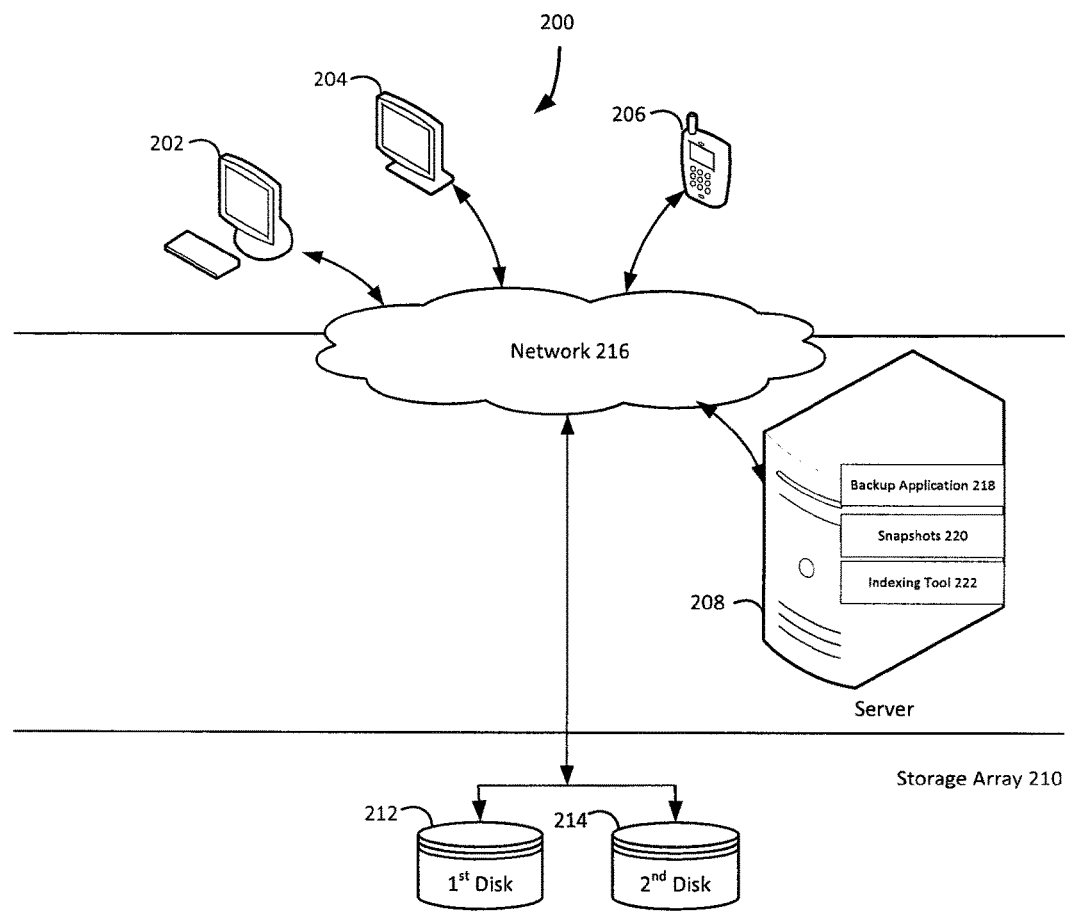
FIG. 2 illustrates a block diagram of an example system for save set indexing outside of backup windows, under an embodiment.

FIG. 2 illustrates a block diagram of a system that implements save set indexing outside of backup windows, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202, a second client 204, and a third client 206; and a server 208 and a storage array 210 that may be provided by a hosting company. The storage array 210 includes a first disk 212 and a second disk 214. The clients 202-206, the server 208, and the storage array 210 communicate via a network 216. Although FIG. 2 depicts the system 200 with three clients 202-206, one server 208, one storage array 210, two disks 212-214, and one network 216, the system 200 may include any number of clients 202-206, servers 208, storage arrays 210, disks 212-214, and networks 216. The clients 202-206 and the server 208 may each be substantially similar to the system 100 depicted in FIG. 1.

The server 208 includes a backup application 218, snapshots 220, and an indexing tool 222. The backup application 218 creates the snapshots 220 of data objects for the clients 202-206 and/or the server 208, and stores the snapshots 220 on the server 208. The system 200 enables the backup application 218 to execute a rollback based on snapshots 220. FIG. 2 depicts the system elements 218-222 residing completely on the server 208, but the system elements 218-222 may reside completely on the server 204, completely on the clients 202-206, completely on another server that is not depicted in FIG. 2, or in any combination of partially on the server 208, partially on the clients 202-206, and partially on the other server.

The backup application 218 may be, for example, EMC Corporation's NetWorker® backup application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers. Although the functionality examples described in this paragraph apply to EMC Corporation's NetWorker® backup application, one of skill in the art would recognize that other backup applications and their corresponding functionalities may be used.

The system 200 creates a snapshot 200 of a save set without creating an index of the save set. For example, the backup application 218 creates a snapshot 200 of the file system /FS1 without the indexing tool 222 indexing the file system /FS1 during the backup window.

The indexing tool 222 may discover multiple un-indexed snapshots 220, including the snapshot, managed by the backup application 218. For example, the indexing tool 222 discovers all of the snapshots 220 stored by the system 200, and identifies which of the snapshots 220 have yet to be indexed. The snapshots 220 that are managed by the backup application 218 may include snapshots taken by the backup application 218 and snapshots which were taken outside the backup application 218 but are still managed by the backup application 218. The indexing tool 222 may discover specified snapshots by providing various filter mechanisms for shortening the search, such as discover snapshots 220 taken within last day, week, or month; discover snapshots 220 for array X and array Y; discover snapshots 220 for client 202 and client 204, discover snapshots 220 taken outside the backup application 218, and discover snapshots 220 not yet indexed.

The indexing tool 222 creates the index of the save set in response to the creating of the snapshot 220 of the save set. With the technological advancements now and in future, there are many ways to index the save sets for the snapshots 220. For example, the indexing tool 222 mounts the snapshot 220 of the file system /FS1 on a proxy host using available mount technologies like Network File System (NFS), Common Internet File System (CIFS), or Storage Area Network (SAN), thereby recreating the save set for the file system /FS1 on the proxy host. Then the indexing tool 222 parses the recreated save set for the file system /FS1 to identify its contents, creates an index of the contents to function as the index of the save set for the file system /FS1, and un-mounts the snapshot of the file system /FS1. The indexing tool 222 may use any backup server itself for mounting and indexing or may use a separate host for mounting and indexing.

In another example, if supported by the snapshot array, the indexing tool 222 identifies a previous index for a previously indexed snapshot 220 of the file system /FS1, determines the difference between the snapshot 220 of the file system /FS1 and the previously indexed snapshot 220 of the file system /FS1, and creates an updated index for the snapshot 220 of the file system /FS1 based on the previous index and the difference, by reusing the common index entries, and adding/removing index entries for the new snapshot 220 based on the differences, such that the updated index functions as the index of the save set for the file system /FS1. This option depends upon the underlying array providing the capability to perform the identification of differences between two snapshots 220. If an array supports enumeration of a snapshot's file system without mounting the snapshot 220, an application program interface for the array can be used to walk the file system and potentially differentiate between two snapshots 220. Indexing the contents directly from a snapshot array can be for full or for subsequent snapshots. For example, the backup application 218 creates a first snapshot 220 of the file system /FS1 at 10:00 AM and a second snapshot 220 of the file system /FS1 at 11:00 AM. The indexing tool 222 retrieves the difference in content from the array and creates the index for the 11:00 AM snapshot 220 without mounting the 11:00 AM snapshot 220.

The indexing tool 222 may determine if a requirement for indexing is satisfied, and create the index of the save set if the requirement for indexing is satisfied. The requirement for indexing may be based on a period of time outside of a backup window for backing up the save set, a memory usage threshold, a central processing unit usage threshold, a time of day, a day of a week, a job queue, a number of un-indexed snapshots, a time interval since a most recent indexing of snapshots, and a difference between the snapshot and a previously indexed snapshot. For example, the indexing tool 222 does not index the save set for the file system /FS1 during the backup window for creating the snapshot 220 of the file system /FS1, when the backup server's CPU usage is higher than an optimal CPU usage indexing threshold, when the backup server's memory usage is higher than an optimal memory usage indexing threshold, when the backup server's job queue is higher than an optimal job queue indexing threshold, or on days and times when the backup server's load has been historically high. In another example, the indexing tool 222 indexes the save set for the file system /FS1 when the number of un-indexed snapshots is equal to or greater than a threshold of 5 un-indexed snapshots, when the time interval since a most recent indexing of snapshots is greater than a threshold of 24 hours, or when a difference between the snapshot and a previously indexed snapshot is greater than a threshold of 10%. Determining the difference between the snapshot and a previously indexed snapshot is dependent upon executing an application program interface, such that indexing does not occur if the difference between the snapshot and the previously indexed snapshot is relatively miniscule, based on a threshold established by a system administrator or a system user. A system administrator or a system user may write their own customized requirement for indexing. The indexing tool 222 may run recursively to determine if a requirement for indexing is satisfied, and/or the indexing tool 222 may initiate any number of dedicated probes to run recursively to determine if any number of corresponding requirements for indexing is satisfied. The indexing tool 222 and/or the any number of dedicated probes may run recursively based on a selection by a system administrator or a system user, such as every minute, every hour, every day, every week, or on demand.

For example, the indexing tool 222 initiates a dedicated probe 1 to determine when the time interval since a most recent indexing of snapshots is greater than s threshold of 24 hours, initiates a dedicated probe 2 to determine when the backup server's memory usage is less than a threshold of 25%, and initiates a dedicated probe 3 to determine when the number of un-indexed snapshots is equal to or greater than a threshold of 20 un-indexed snapshots. Each of the dedicated probes 1-3 may be scheduled to run recursively based on their own corresponding time intervals, and independently evaluate whether their own corresponding requirement for indexing is satisfied. For example, the dedicated probe 3 determines that the number of 14 current un-indexed snapshots is not equal to or greater than its threshold of 20 un-indexed snapshots. Each of the dedicated probes 1-3 may record the most recent occasion when the dedicated probe determined whether its requirement was satisfied and record the most recent occasion when their own corresponding requirement for indexing was satisfied. For example, the dedicated probe 1 records the most recent occasion when the time interval since a most recent indexing of snapshots was greater than the threshold of 24 hours, which led to the indexing of 10 snapshots, and the dedicated probe 2 records the most recent occasion when the backup server's memory usage was less than the threshold of 25%, which led to the indexing of 5 snapshots. When the requirement for indexing is satisfied for any dedicated probe, the indexing tool 222 can create the index(es) of the save set(s) corresponding to the snapshot(s) associated with the dedicated probe.

Creating the index may be based on a schedule determined by a system user. The indexing tool 222 can index the save sets for the snapshots 220 that are not cataloged based on a schedule or a system user request. For example, a data protection administrator schedules the indexing based on his/her requirement. Whether to do the indexing at the time of backup or not may be determined by a system user's response to a simple check box. If the check box is checked, then the indexing may be done during the backup window, otherwise indexing will after the backup is done and the system user or the indexing tool 222 determines that it is time for indexing. Once indexing of save set for a snapshot 220 is done, the indexing tool 222 sets a flag for the save set and snapshot 220, such as "Indexed."

The indexing tool 222 may report a creation of an index to a system user. For example, the indexing tool 222 reports the indexing of the save set for the file system /FS1 to a data protection administrator. The indexing tool 222 may report to a system user which save sets for which snapshots 220 have been indexed, and for which save sets for which snapshots 220 the indexing is still pending. When indexing is decoupled from the backup window, indexing can occur much later than the backup, which significantly reduces overall backup time.

Figure 3:
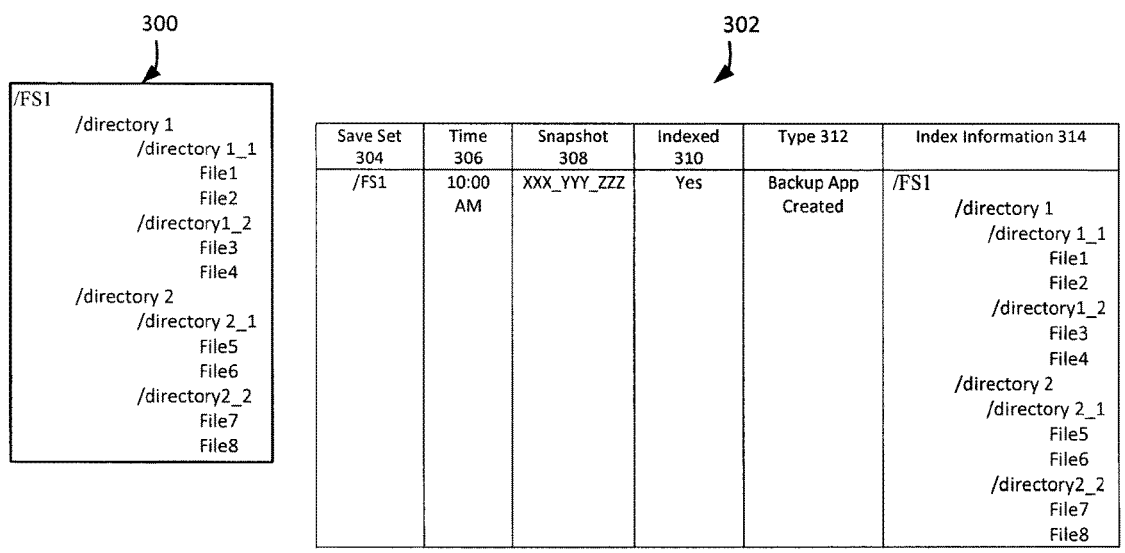
FIG. 3 is a screen shot illustrating extremely simplified example data for save set indexing outside of backup windows, under an embodiment.

FIG. 3 illustrates extremely simplified example data for save set indexing outside of backup windows, under an embodiment. The data includes save set 300 for the file system /FS1 and data 302 for a snapshot of the file system /FS1. The save set 300 identifies two directories, four sub-directories, and eight files in the save set for the file system /FS1. The data 302 for the snapshot includes a save set 304 column, a time 306 column, a snapshot 308 column, an indexed 310 column, a type 312 column, and an index information 314 column. Although not depicted in FIG. 3, the data 302 for the snapshot may include any number and types of additional rows and additional columns. The first data row of the data 302 for the snapshot indicates that a snapshot was created the file system /FS1 at 10:00 AM, the snapshot is named XXX_YYY_ZZZ, the save set for the snapshot has been indexed, the snapshot type was created by the backup application 218, and the corresponding indexing information of the save set for the file system /FS1. Without the index information 314, a data protection administrator is unable to selectively roll back any individual portions of the save set for the file system /FS1. However, with the index info 314, a data protection administrator may identify that the snapshot includes a copy of File4, which has been corrupted in the client 202, and select the copy of File 4 from the snapshot to restore File4 on the client 202 to the state of File 4 at 10:00 AM.

Figure 4:
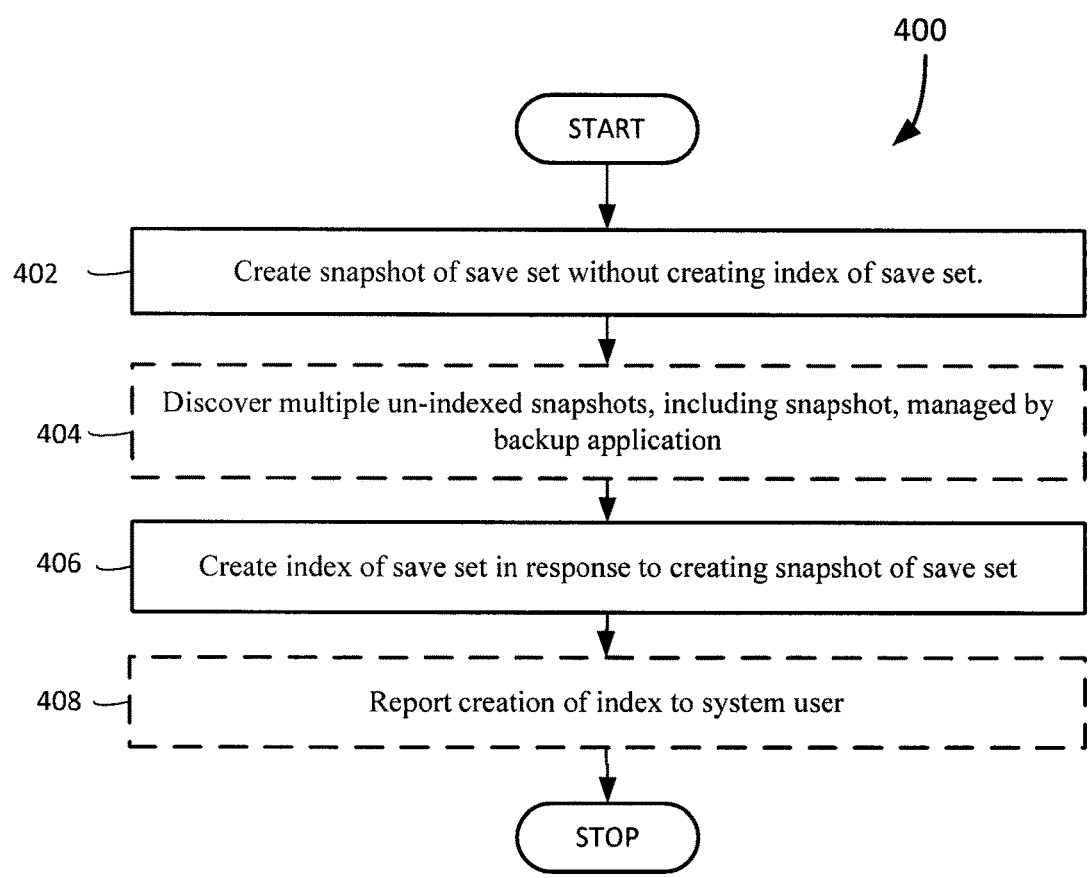
FIG. 4 is a flowchart that illustrates a method of save set indexing outside of backup windows, under an embodiment.

FIG. 4 is a flowchart that illustrates a method for save set indexing outside of backup windows, under an embodiment. Flowchart 400 illustrates method acts illustrated as flowchart blocks for certain steps involved in and/or between the clients 202-206 and/or the server 208 of FIG. 2.

A snapshot is created of a save set without creating an index of the save set, block 402. For example, the backup application 218 creates a snapshot of the file system /FS1 without the indexing tool 222 indexing the file system /FS1 during the backup window.

Multiple un-indexed snapshots are optionally discovered, including a snapshot, which are managed by a backup application, block 404. For example, the indexing tool 222 discovers all of the snapshots 220 stored by the system 200, and identifies which of the snapshots 220 have yet to be indexed.

An index is created of a save set in response to creating a snapshot of the save set, block 406. For example, the indexing tool 222 mounts the snapshot of the file system /FS1 on a proxy host snapshot, thereby recreating the save set for file system /FS1 on the proxy host, parses the recreated save set for file system /FS1 to identify its contents, creates an index of the contents to function as the index of the save set for file system /FS1, and un-mounts the snapshot of the file system /FS1.

A creation of an index is optionally reported to a system user, block 408. For example, the indexing tool 222 reports the indexing of the save set for file system /FS1 to a data protection administrator. The indexing tool 222 enables the system 200 to meet more aggressive timelines of service level agreements and to efficiently handle more snapshots 220 during the same amount of time, which results in a higher total customer experience.

Although FIG. 4 depicts the blocks 402-408 occurring in a specific order, the blocks 402-408 may occur in another order. In other implementations, each of the blocks 402-408 may also be executed in combination with other blocks and/or some blocks may be divided into a different set of blocks.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for save set indexing outside of backup windows, the system comprising:
a processor-based application executed on a computer and configured to:
discover a plurality of un-indexed snapshots of a save set, the un-indexed snapshots being a subset of all snapshots managed by backup application, each un-indexed snapshot being created without an index of the save set;
mount a first snapshot of the plurality of snapshots on a proxy host in order to recreate the save set on the proxy host after the first snapshot has been created;
parse the recreated save set on the proxy host to identify contents of the recreated save set;
create the index of the identified contents to function as the index of the save set for the first snapshot;
un-mount the first snapshot; and
create an index for a second snapshot of the plurality of un-indexed snapshots based on the index of the first snapshot, the second snapshot being created without mounting the second snapshot by reusing common index entries with the index of the first snapshot and adding index entries to the index for the second snapshot based on detected differences between the first snapshot and the second snapshot.

2. The system of claim 1, wherein the processor-based application is further configured to create indexes for each of the discovered plurality of un-indexed snapshots of the save set.

3. The system of claim 1, wherein creating the index comprises:
determining if a requirement for indexing is satisfied; and
creating the index of the contents to function as the index of the save set in response to a determination that the requirement for indexing is satisfied, wherein the requirement for indexing is based on at least one of a memory usage threshold, a central processing unit usage threshold, a number of un-indexed snapshots, and a difference between the snapshot and a previously indexed snapshot.

4. The system of claim 1, wherein creating the index comprises:
identifying a previous index for a previously indexed snapshot;
determining a difference between the snapshot and the previously indexed snapshot;
creating an updated index for the snapshot based on the previous index and the difference, wherein the updated index functions as the index of the save set.

5. The system of claim 1, wherein creating the index is based on a schedule determined by a system user.

6. The system of claim 1, wherein the processor-based application is further configured to report the creation of the index to a system user.

7. A computer-implemented method for save set indexing outside of backup windows, the method comprising:
discovering a plurality of un-indexed snapshots of a save set, the un-indexed snapshots being a subset of all snapshots managed by backup application, each un-indexed snapshot being created without an index of the save set;
mounting a first snapshot of the plurality of snapshots on a proxy host in order to recreate the save set on the proxy host after the first snapshot has been created;

parsing the recreated save set on the proxy host to identify contents of the recreated save set;
creating the index of the contents to function as the index of the save set for the first snapshot;
un-mounting the first snapshot; and
creating an index for a second snapshot of the plurality of un-indexed snapshots based on the index of the first snapshot, the second snapshot being created without mounting the second snapshot by reusing common index entries with the index of the first snapshot and adding index entries to the index for the second snapshot based on detected differences between the first snapshot and the second snapshot.

8. The method of claim 7, wherein the method further comprises creating indexes for each of the discovered plurality of un-indexed snapshots of the save set.

9. The method of claim 7, wherein creating the index comprises:
determining if a requirement for indexing is satisfied; and
creating the index of the contents to function as the index of the save set in response to a determination that the requirement for indexing is satisfied, wherein the requirement for indexing is based on at least one of, a memory usage threshold, a central processing unit usage threshold, a number of un-indexed snapshots, and a difference between the snapshot and a previously indexed snapshot.

10. The method of claim 7, wherein creating the index comprises:
identifying a previous index for a previously indexed snapshot;
determining a difference between the snapshot and the previously indexed snapshot;
creating an updated index for the snapshot based on the previous index and the difference, wherein the updated index functions as the index of the save set.

11. The method of claim 7, wherein creating the index is based on a schedule determined by a system user.

12. The method of claim 7, wherein the method further comprises reporting the creation of the index to a system user.

13. A computer program product, comprising a non-transitory computer-readable medium having a computer-readable program code embodied therein to be executed by one or more processors, the program code including instructions to:
discover a plurality of un-indexed snapshots of a save set, the un-indexed snapshots being a subset of all snapshots managed by backup application, each un-indexed snapshot being created without an index of the save set;
mount a first snapshot of the plurality of snapshots on a proxy host in order to recreate the save set on the proxy host after the first snapshot has been created;
parse the recreated save set on the proxy host to identify contents of the recreated save set;
create the index of the contents to function as the index of the save set for the first snapshot;
un-mount the first snapshot; and
create an index for a second snapshot of the plurality of un-indexed snapshots based on the index of the first snapshot, the second snapshot being created without mounting the second snapshot by reusing common index entries with the index of the first snapshot and adding index entries to the index for the second snapshot based on detected differences between the first snapshot and the second snapshot.

14. The computer program product of claim 13, wherein the program code further includes instructions to create indexes for each of the discovered plurality of un-indexed snapshots of the save set.

15. The computer program product of claim 13, wherein creating the index comprises:
determining if a requirement for indexing is satisfied; and
creating the index of the contents to function as the index of the save set in response to a determination that the requirement for indexing is satisfied, wherein the requirement for indexing is based on at least one of, a memory usage threshold, a central processing unit usage threshold, a number of un-indexed snapshots, and a difference between the snapshot and a previously indexed snapshot.

16. The computer program product of claim 13, wherein creating the index comprises:
identifying a previous index for a previously indexed snapshot;
determining a difference between the snapshot and the previously indexed snapshot;
creating an updated index for the snapshot based on the previous index and the difference, wherein the updated index functions as the index of the save set.

17. The computer program product of claim 13, wherein creating the index is based on a schedule determined by a system user.

* * * * *